United States Patent

Monteiro et al.

[11] 3,993,231
[45] Nov. 23, 1976

[54] TUBE CUTTING APPARATUS

[75] Inventors: Levi Monteiro, Plymouth; Joseph F. Ogorzalek, Marshfield, both of Mass.

[73] Assignee: Armstrong Cork Company, Lancaster, Pa.

[22] Filed: Feb. 2, 1976

[21] Appl. No.: 654,635

[52] U.S. Cl. .................................. 225/96; 83/11; 144/2 R; 144/136 R; 144/215
[51] Int. Cl.² .......................................... B26F 3/00
[58] Field of Search ................ 225/2, 94, 96, 96.5; 82/78, 100, 101; 144/2 R, 136 R, 215; 83/11, 12

[56] References Cited
UNITED STATES PATENTS

| | | | |
|---|---|---|---|
| 2,314,102 | 3/1943 | Poole | 144/215 |
| 3,143,014 | 8/1964 | Blake | 82/101 |
| 3,568,488 | 3/1971 | Franks | 225/101 X |

Primary Examiner—Othell M. Simpson
Assistant Examiner—Fred A. Silverberg

[57] ABSTRACT

Disclosed is an apparatus for cutting elongated tubular material into short individual sections. The apparatus comprises a plurality of circular knives fixedly mounted in spaced relationship to each other along the axis of a non-rotating shaft. Rotatable spacing discs having a diameter slightly greater than the diameter of the knives are mounted one on each end of the knife-carrying shaft and are adapted to engage the bare end portions of a rotatable mandrel having a tube to be cut thereon when the knives are moved into cutting engagement with the tube. The rotatable spacing discs riding on the rotatable tube-carrying mandrel prevent the knives from cutting completely through the tube wall and make possible the retention of very thin, frangible, residual tube wall sections of precise constant thickness at the locations of the cuts. This allows the tube to be removed from the mandrel in one piece and then broken later, if desired, into individual short sections by hand or machine.

2 Claims, 3 Drawing Figures

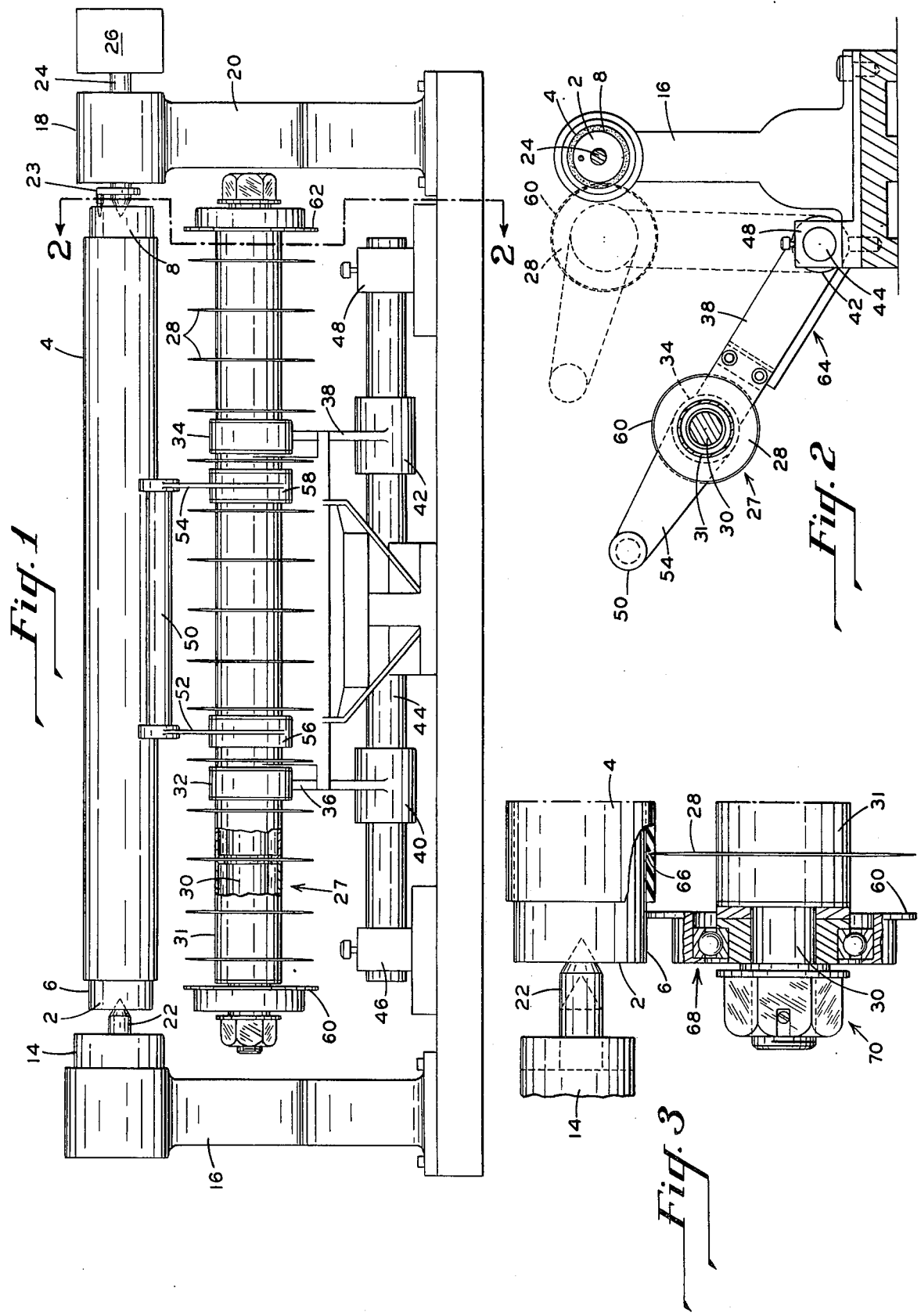

TUBE CUTTING APPARATUS

BACKGROUND OF THE INVENTION

1. Field of the Invention

This invention relates generally to the cutting of elongated tubular material into short individual tube sections. More specifically, the invention relates to an apparatus for simultaneously making a plurality of circumferential cuts incompletely through the wall of a rubber tube or the like mounted on a rotating mandrel. The depths of the cuts are predetermined to result in the retention of thin, frangible, residual tube wall portions at the locations of the cuts. The residual wall portions are of constant thickness and may be reproduced in subsequently cut tubes which may be of varying thickness with no adjustment of the device being required.

2. Description of the Prior Art

Various devices have been proposed in the past for cutting elongated tubular material into individual shorter sections. It has been found in the past, however, that in such a cutting operation, it is desirable when cutting tubular material which is mounted on a rotating mandrel, to keep the cutting knives from contacting the mandrel, so that it would not become scored by the knives, and so that the knives would not become dull.

U.S. Pat. No. 3,143,041 discloses a means for preventing the damage of the edge of a rotary cutter in such an operation and proposes the use of a cutting platen equipped with an insert of fiber or similar material at its outer periphery opposite the rotary cutter. The insert is of a hardness appreciably less than metal and minimizes damage to the edge of the rotary cutter upon penetration thereof. A cut depth limit roller mounted on the knife support and engaging the outer surface of the tubular material being cut is also provided.

U.S. Pat. No. 1,033,411 proposes a solution to the problem of eliminating undue movement of a plurality of cutters relative to the material supporting roll during operation of the machine. This patent discloses the use of an adjustable means for locking or securing the cutter bar against undue movement in its bearings when the cutters are in operative position. The adjustable means comprises a friction locking device carried in each of a pair of spaced posts on each side of the machine, thus maintaining the accuracy of the cutters in their adjusted cutting position relative to the opposing bed roll during working operation.

U.S. Pat. No. 3,207,016 discloses a device for cutting sheet material such as roofing so that it can later be broken into a plurality of individual shingles. The circular knife in this device is held in constant spaced relation to a flat, horizontal material-supporting surface by means of rollers mounted on the ends of the knife-carrying shaft and which ride in inwardly opening channels which extend longitudinally of the table as part of the frame. Thus, a relatively constant spacing is achieved between the knife and the material-supporting surface.

Another arrangement for controlling and limiting the depth of penetration of rotary knives into the surface of a cylindrical object is disclosed by U.S. Pat. No. 2,314,102. In this device either an adjustable shoe or rollers may be provided to ride on the outer surface of the object while rotatable knives mounted on the apparatus score or cut into the surface to a predetermined depth. Adjustable means is provided to control and limit the depth of penetration of the rotary knives.

An apparatus for scoring or cutting paper is disclosed by U.S. Pat. No. 246,923. The apparatus includes a series of pressure rolls and rotary disc cutters. Each of the rolls and cutters are individually adjustably mounted on a supporting bar extending transversely across the machine to permit varying of the relationship of the rolls and cutters with respect to a bed roll over which the paper to be cut is passed.

The prior art, however, discloses no solution to the problem of circumferentially cutting an elongated rubber tube incompletely through the thickness of the wall surface thereof in such a manner that very thin, frangible residual wall portions of precise, constant thickness remain at the location of the cuts, thereby enabling the tube to be removed from its supporting mandrel in one piece and broken later, if desired, into individual short sections by hand or machine.

SUMMARY OF THE INVENTION

This invention relates to a device for simultaneously making a plurality of circumferential, longitudinally spaced cuts incompletely through the wall thickness of a mandrel-mounted elongated tube or rubber or the like so that the tube can be removed from the mandrel as a unit and subsequently broken apart at the location of the cuts to produce short tube sections. To be able to do this, however, due to the nature of rubber or like elastic material, the frangible residual wall sections of the tubes at the locations of the cuts must not only be of a minimum thickness, but such thickness must be constant around the circumference of the tube. This residual, frangible wall thickness must be reproducible in subsequently cut tubes without interim adjustment being required, regardless of such things as variations in the thickness of the walls of the tubes, variations in the resilience of the tube material, eccentricity of the mandrel on which the tube was mounted, or of the tube itself, and other factors such as looseness of the bearings carrying the mandrel on which the tube is mounted.

The apparatus of the present invention solves the problem of maintaining a constant, precise, very thin frangible residual wall portion at the locations of the cuts in the rubber tube by using the material-supporting mandrel surface as the reference surface for the depth-of-cut limiting means, thereby duplicating the contour of the tube-carrying mandrel in the cuts formed in the tube. The cut depth limiting means of this invention comprises rotatable spacing discs positioned on the knife-bearing shaft at the outer ends thereof and adapted to engage the bare ends of the tube-carrying mandrel. The spacing discs have a diameter sufficient to allow the knives to penetrate the tube wall to the depth adjacent the inner surface thereof without touching the mandrel whereby thin, constant thickness, precise residual frangible tube wall portions are provided at the locations of the cuts and these may be reproduced in each successive tube cut without interim adjustment. With this device, obviously, there is no problem of the knives contacting the mandrel and being blunted thereby or scoring of the mandrel by the knives.

BRIEF DESCRIPTION OF THE DRAWINGS

FIG. 1 is a front elevational view of the tube cutting device of this invention;

FIG. 2 is an end elevational view partially in section and taken along Line 2—2 of FIG. 1; and FIG. 3 is an enlarged top plan view, partially broken away, of one end of the apparatus, showing one of the spacing discs and one of the knives in the position they assume when the knives are in cutting engagement with the tube to be cut.

DESCRIPTION OF THE PREFERRED EMBODIMENT

Referring now to the drawings, there is shown in FIG. 1 a tube cutting apparatus having a rotatable mandrel 2 with an elongated tubular member 4 mounted thereon. The tubular member 4 is of such predetermined length that when it is mounted as shown on the mandrel 2, the end portions 6 and 8 of the mandrel 2 will not be covered. The mandrel 2 is horizontally mounted for rotation between tail stop 14 on vertical support member 16 and bearing block 18 on vertical support member 20. Mandrel 2 is supported on one end by a retractable tapered center point 22 in tail stop 14 and through a conventional drive coupling means 23 to a drive shaft 24 in bearing block 18 on the other end. Rotary motion is provided for the mandrel 2 by conventional drive means 26 through drive shaft 24 and coupling 23.

The cutter assembly 27 comprises a plurality of circular knives 28 mounted in fixed position on non-rotatable shaft 30 and held in spaced relationship to each other along the axis thereof by means of spacers 31. The knife-bearing shaft 30 is mounted in sleeve members 32 and 34 having arms 36 and 38 extending therefrom and connected to sleeves 40 and 42 positioned on shaft 44 mounted in end bearing blocks 46 and 48. The knives 28 are adapted to be brought into cutting engagement within tubular member 4 by means of handle 50 supported by arms 52 and 54, which are connected to sleeve members 56 and 58, rotatably mounted on knife-bearing shaft 30. Rotatable spacing discs 60 and 62 mounted one on each end of shaft 30 are adapted to engage the bare end portions 6 and 8 of mandrel 2 when the knives 28 are brought into cutting engagement with the tubular member 4 mounted thereon. Discs 60 and 62 have a diameter sufficient to allow the knives 28 to penetrate tubular member 4 to a depth adjacent the inner surface thereof without touching the mandrel 2. The cutter assembly may be supported when not in use by means of a support structure 64 as best seen in FIG. 2.

The cutter assembly 27 is shown in FIGS. 1 and 2 in the "at rest" position, or the position it would normally be in when not in use. The cutter assembly is shown by dotted lines in FIG. 2 in the position it would be in when in use, with the spacing discs (in this view, the spacing disc 60) in engagement with the bare surface of the mandrel 2 and the knives 28 in cutting engagement with tubular member 4. As more clearly shown in FIG. 3, when the spacing disc 60 is in engagement with the bare end portion 6 of mandrel 2, circular knife 28 penetrates through the wall thickness of tubular member 4 to a depth adjacent the inner surface thereof leaving a residual frangible wall portion 66 at the location of the cut. As also shown in FIG. 3, the spacing discs (in this view, the spacing disc 60) may be rotatably supported on the end portions of knife-bearing shaft 30 by means of a conventional bearing assembly 68 held in place by a lock nut and washer assembly 70.

Through use of the above-described tube cutting apparatus, it can be seen that since the bare mandrel surface is used as a reference position, the frangible residual wall sections, around the circumference of the cuts and from tube to tube, will be reproduced to a constant precise thickness without interim adjustment, regardless of the tubes' wall thickness variation, the tube material resilience variation, or eccentricity of the mandrel and/or of the tube. Also, through the use of this apparatus, the individual tube portions, which are cut from the elongated tubular material, will have edges which are cut perfectly perpendicular to the mandrel axis and the edge quality will be superior to die-cut edges. It can further be seen that the knives will retain their sharpness longer because only tube material is contacted thereby; the knives can be easily rotated so that new cutting edges are indexed into position; the mandrel is never scored by the knives; and very importantly, the tube remains in one piece until separation into pieces is desired, which makes possible the removal of the tube as a unit from the mandrel and to be later, if desired, easily broken into individual sections by hand or machine.

What is claimed is:

1. A tube cutter adapted to simultaneously make a plurality of circumferential, longitudinally-spaced cuts incompletely through the wall thickness of a mandrel-mounted elongated tube of rubber or the like so that the cut tube can be removed from the mandrel and further processed as a unit, and then, if desired, be subsequently broken apart at the location of the cuts to produce short tube sections, said tube cutter comprising:
   a. a rotatable mandrel adapted to support a tube to be cut and having a length sufficient to protrude beyond the ends of said tube to provide bare ends on said mandrel during cutting,
   b. means for rotating said mandrel,
   c. a knife-bearing shaft,
   d. circular knives positioned in spaced relationship to each other along the axis of said shaft,
   e. rotatable spacing discs positioned on said knife-bearing shaft at the outer ends thereof and adapted to engage the bare ends of said mandrel, during cutting, said spacing discs having a diameter sufficient to allow said knives to penetrate said tube to a depth adjacent the inner surface thereof without touching said mandrel, and
   f. means for moving said knife-bearing shaft to a position wherein said spacing discs engage the bare ends of said mandrel when said knives are in cutting engagement with a tube mounted thereon.

2. A tube cutter according to claim 1 wherein the knife-bearing shaft and the circular knives positioned thereon are non-rotatable.

* * * * *